United States Patent [19]

Gyenes et al.

[11] Patent Number: 5,085,951
[45] Date of Patent: Feb. 4, 1992

[54] VENTED BATTERY

[75] Inventors: Russell E. Gyenes; Raymond J. Kleinert, III, both of Sunrise, Fla.

[73] Assignee: Motorola, Inc., Schaumburg, Ill.

[21] Appl. No.: 617,750

[22] Filed: Nov. 26, 1990

[51] Int. Cl.$^5$ ............................................... H01M 2/12
[52] U.S. Cl. ........................................ 429/86; 429/89; 429/53
[58] Field of Search ................ 429/86, 89, 53, 6, 121, 429/178

[56] References Cited

U.S. PATENT DOCUMENTS

| | | | |
|---|---|---|---|
| 4,002,496 | 1/1977 | Nitta et al. | 429/86 X |
| 4,147,841 | 4/1979 | Shroff | 429/86 |
| 4,576,879 | 3/1986 | Nakazawa et al. | 429/86 |
| 4,584,248 | 4/1986 | Iwata | 429/54 |

FOREIGN PATENT DOCUMENTS 560087  9/1923  France ................................ 429/86

Primary Examiner—Anthony Skapars
Attorney, Agent, or Firm—Daniel K. Nichols

[57] ABSTRACT

A vented battery includes an aperture 108 in the battery housing 104 for venting built up gases inside of the vented battery 104. The aperture 108 is covered with a sintered metal vent 204. The sintered vent can be molded in the battery housing, staked to the housing, friction fitted into the aperture, or attached using other commonly known methods.

In an alternate embodiment, a vented battery 200 has at least one battery contact 210 formed from sintered metal allowing for the venting of gases inside of housing 104. The battery contact 210 performs the dual function of allowing the battery 200 to be vented, and also act as electrical battery contacts which allow battery 200 to be connected to external devices.

A communication device 300 includes a radio 302 that has a radio battery retainer 310, or other external housing member made from sintered metal thereby allowing for radio 302 to be vented.

6 Claims, 3 Drawing Sheets

VENTED BATTERY

TECHNICAL FIELD

This invention relates to batteries, and more specifically to a vented battery which utilizes a vent for venting gases from the battery.

BACKGROUND

Under normal operating conditions, batteries such as nickel-cadmium batteries, operate with internal pressure under an equilibrium condition which the battery housing is designed to withstand. However, under certain conditions, such as when the battery is being charged too rapidly, internal pressures inside the battery may increase to the point where the housing may rupture. Since this rupturing could create a major hazard, some types of batteries normally require a battery vent, especially batteries used in hazardous environments. Prior methods of venting batteries (cells and battery packs) have included the use of rupturable membranes which prevented the rupturing of the battery housing. Unfortunately, once the membrane would get ruptured the battery became useless since the aperture in the housing would allow water, and dust, to penetrate into the housing. Some other approaches at venting gases having included methods which allow for the resealing of the vent once the pent up gases have been released. These approaches have proved costly to implement, due to the added piece parts involved. In addition these approaches have the disadvantage of not being able to be submersed in water.

More recent developments in venting technology has seen the use of GOR-TEX® fabric (W. L. Gore & Associates Inc., Newark, Dela.) and other similar materials, covering an aperture in the battery housing, whereby gases can escape from the battery, and yet keep water from penetrating the battery housing. The benefit of using a fabric like GOR-TEX® is that a water submersible vented battery can be produced.

Referring to FIG. 1, a drawing of a prior art battery 100 is shown. Battery 100 has electrical contacts 102 located on top battery surface 110. The contacts 102, allow the battery to power an external device such as a battery powered communication device. Charging contacts 106, allow battery 100 to be placed in a battery charging device for battery recharging. A vent hole or aperture 108 allows gases which are pent up inside the battery housing 104 to be released. Battery 100 can be a battery pack having a set of energy cells inside of housing 104, or could be an individual energy cell.

FIG. 2a is a partial cross-sectional view of a prior art battery venting arrangement as shown in FIG. 1, having a vent hole 108 which is covered by a piece of GOR-TEX® fabric 202 (W. L. Gore & Associates Inc., Newark, Dela.). The fabric 202 is attached by heat staking it to the inner wall of top housing 110 thereby allowing the gases inside housing 104 to be released via aperture 108. At the same time, the fabric 202 does not allow water to penetrate into the inside of housing 104 due to the fabric's small porous openings. Air can pass through the fabric 202 due to the fact that the molecular structure of air is much smaller than that of water. By stopping water intrusion into housing 104, damage to the battery cells inside of battery 100 can be avoided.

All of the prior methods mentioned, have the disadvantage of being relatively expensive to produce, and in some cases very difficult to manufacture due to the added parts required. With the need for submersible batteries increasing, especially in portable communication device applications, a need exists for a vented battery which can also be submersible.

SUMMARY OF THE INVENTION

Briefly, according to the invention, a vented battery using a sintered metal vent is disclosed. Several methods of attaching the sintered metal vent are also disclosed. A battery having a sintered metal battery contact which serves the dual purpose of being a battery contact and battery vent is also disclosed.

In another aspect of the present invention, a communication device uses a vented battery having a sintered metal vent. The communication device can also use the present sintered metal vent in order to vent the radio housing as well.

The features of the invention believed to be novel are set forth with particularity in the appended claims. The invention itself may be best understood by reference to the following description taken in conjunction with the accompanying drawings.

DETAILED DESCRIPTION OF THE PREFERRED EMBODIMENT

Figure 2A:
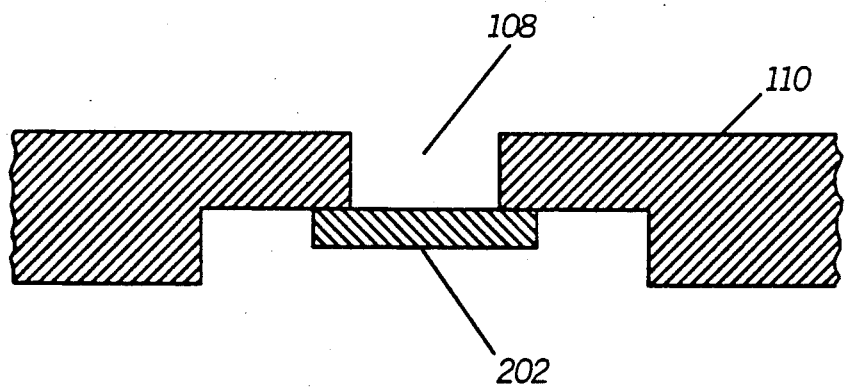
FIG. 2a is a partial cross-sectional view of the prior art vent of FIG. 1.
Figure 2B:
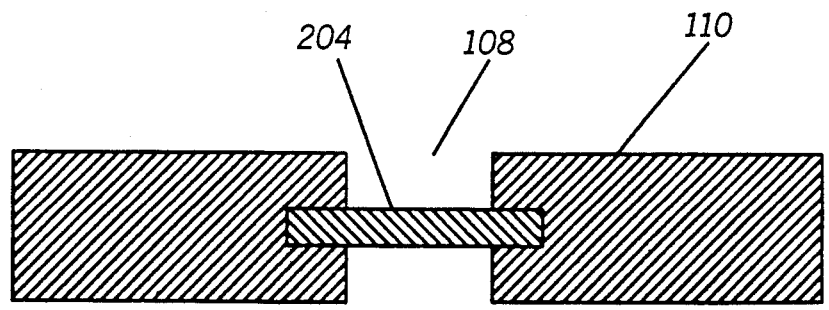
FIG. 2b is a partial cross-sectional view of a battery in accordance with the present invention.

In FIG. 2b a molded in piece of sintered metal 204 is shown which is located within the wall of housing 110, and which also covers the aperture 108. The piece of sintered metal 204 acts as a vent due to the porous nature of the sintered metal used. By using commercially available sintered metal having a pore size which does not allow for the passage of water (or other liquids), but yet lets air pass through the pores, an air vent which does not allow the passage of water can be formed. The pore size of the sintered metal used is controlled in the manufacture of the metal by the conventional sintering process which is utilized. Preferably, the sintered metal is made from nickel alloy, but other commercially available sintered metals could be used as well. The sintered metal vent 204 is placed in a conventional mold before the battery housing which is preferably formed out of a plastic such as polycarbonate is molded. Once the housing is formed the sintered metal vent 204 is held in place by top housing 110.

Figure 2C:
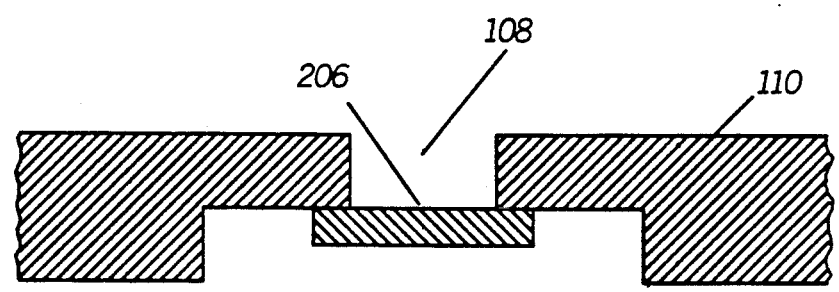
FIG. 2c is a partial cross-sectional view of an alternate embodiment of a battery in accordance with the present invention.

In FIG. 2c a partial cross-sectional view of an alternate embodiment of the present invention is shown. In this embodiment the sintered metal vent 206 is staked into the inside part of top housing section 110 using conventional manufacturing techniques.

Figure 2D:
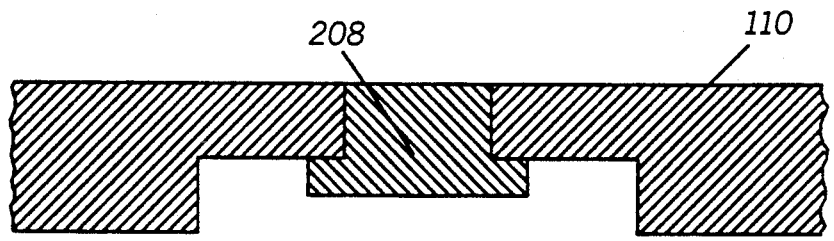
FIG. 2d is a partial cross-sectional view of a second alternate embodiment of a battery in accordance with the present invention.

In FIG. 2d a partial cross-sectional view of a sintered metal vent 208, that has been friction fitted against top housing section 110 and into aperture 108, is shown. Once the metal vent 208 is in place, the aperture is effectively covered, not allowing water, dust, etc. to enter via aperture 108, but yet allowing air to flow through. Though a few methods of attaching the sintered metal vent have been discussed, other methods which are known in the art can also be utilized.

Figure 1:
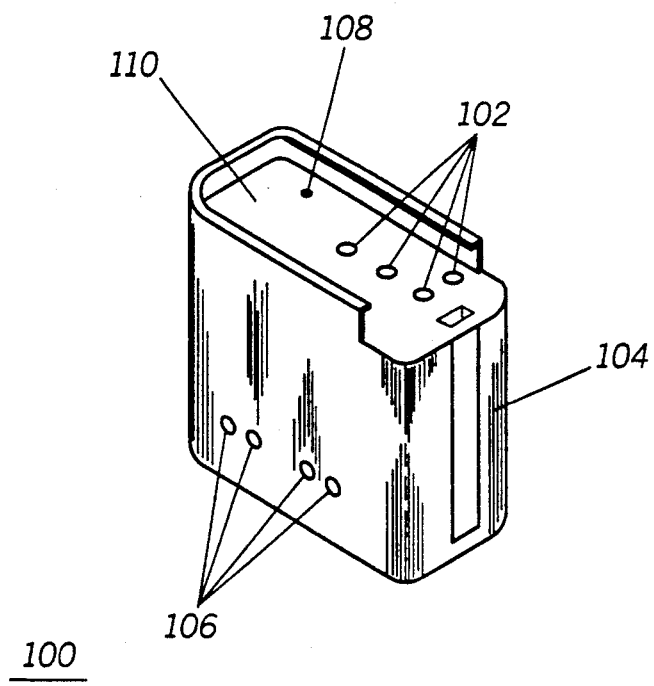
FIG. 1 is a perspective view of a prior art battery having a vent.
Figure 2E:
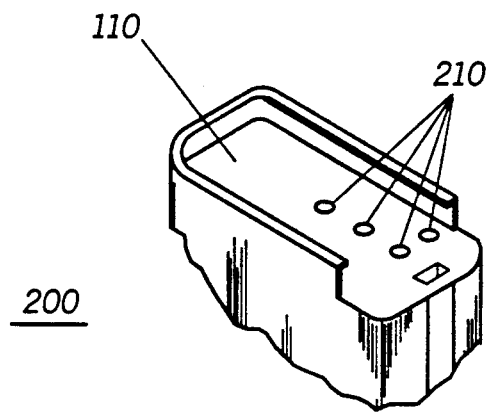
FIG. 2e is a partial perspective view of a third alternate embodiment in accordance with the present invention.

FIG. 2e shows a set of battery contacts 210 with at least one of the contacts 210 formed from sintered metal. In this embodiment, the battery contact 210 is used to connect battery 200 to an external battery operated device, and also acts as a vent for the battery. By forming at least one of the battery contacts 210 out of sintered metal, a major cost savings can result due to the dual function of contact 210. By having a sintered metal battery contact 210, the number of parts required to produce a vented battery are reduced, as are the associated manufacturing costs. Since the use of a sintered metal battery contact 210 reduces the number of parts required in making a vented battery, this would be the preferred method of venting a battery such as battery 200. Other locations in the battery housing could also be used for the vent, such as the bottom of the battery housing, or if the battery is a rechargeable battery, the battery recharging contacts could also be used (similar to contacts 106 shown on FIG. 1).

Figure 3A:
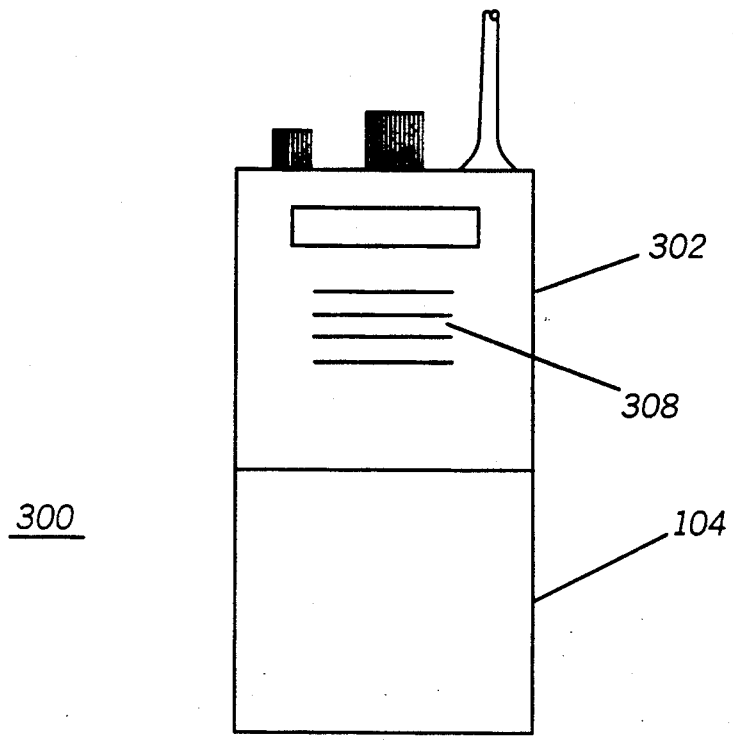
FIG. 3a is a front elevational view of a portable communication device using a battery which employs the present invention.

In FIG. 3a a battery powered portable communication device 300 such as a two way portable radio 302 is shown utilizing the present invention. The radio 302 is powered by vented battery 104 which allows the radio 302, and battery 104, to be submersed (this assumes that radio 302 is also submersible), and yet allows battery 104 to vent out gases built up inside of the battery 104. Radio 302 is shown having speaker grill area 308. In a submersible radio the speaker grill area 308 would be sealed with plastic, treated felt, or other water repellant material.

Figure 3B:
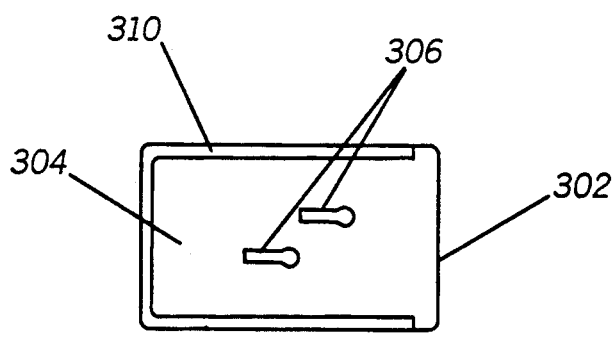
FIG. 3b is a bottom view of the portable communication device of FIG. 3a utilizing the present invention.

Finally, in FIG. 3b the bottom of radio 302 is shown, displaying bottom housing 304 which has radio contacts 306, and battery retainer 310. The use of a sintered metal vent which has been discussed can also be used in venting radio 302. Using a sintered metal vent would be very beneficial especially if radio 302 were a submersible radio, which would mean that radio 302 would be totally sealed. Using a sintered metal vent would be very beneficial in a water submersible radio, since the venting would help port the radio speaker during normal radio operations. By having some of the housing pieces of radio 302 made from sintered metal such as battery retainer 310, more venting can be had for radio 302. Any other external housing pieces of radio 302 could be manufactured from sintered metal, such as the speaker grill area 308.

While the present invention has been described in conjunction with specific embodiments, it is evident that many alternatives will become apparent to those skilled in the art. The present invention is intended to embrace all such alternatives which fall within the scope of the appended claims.

What is claimed is:

1. A battery, comprising:
   a battery housing having an aperture therethrough; and
   a batery contact formed from sintered metal covering said aperture, the battery contact also serving as a vent for the batery.

2. A vented battery as described in claim 1, wherein the battery contact has a substantially flat surface and is molded into the battery housing.

3. A vented battery as described in claim 1, wherein the battery contact is staked into the battery housing.

4. A vented battery as described in claim 1, wherein the battery contact is friction fitted into the battery housing aperture.

5. A vented battery as defined in claim 1, wherein the battery contact is formed of nickel alloy.

6. A communication device having a vented battery, comprising:
   a communication device;
   a vented battery having a housing with an aperture there through, and a sintered metal battery contact that also serves as a battery vent covering the aperture.

* * * * *